April 13, 1954   J. B. GODSHALK   2,675,522
METHOD AND APPARATUS FOR TESTING STORAGE BATTERIES
Filed Dec. 12, 1952                        3 Sheets-Sheet 1

INVENTOR:
JAMES B. GODSHALK
BY: Stone, Boyden & Mack,
ATTY'S

April 13, 1954     J. B. GODSHALK     2,675,522
METHOD AND APPARATUS FOR TESTING STORAGE BATTERIES Filed Dec. 12, 1952     3 Sheets-Sheet 2

INVENTOR:
JAMES B. GODSHALK
BY Stone, Boyden & Mack,
ATTY'S.

April 13, 1954  J. B. GODSHALK  2,675,522
METHOD AND APPARATUS FOR TESTING STORAGE BATTERIES
Filed Dec. 12, 1952  3 Sheets-Sheet 3

INVENTOR:
JAMES B. GODSHALK
BY: Stone, Boyden & Mack
ATTY'S

Patented Apr. 13, 1954

2,675,522

UNITED STATES PATENT OFFICE 2,675,522

METHOD AND APPARATUS FOR TESTING STORAGE BATTERIES

James B. Godshalk, West Pikeland Township, Chester County, Pa., assignor to Fox Products Company, Philadelphia, Pa., a corporation of Pennsylvania Application December 12, 1952, Serial No. 325,660

14 Claims. (Cl. 324—29)

This invention relates to an improved method and apparatus for testing multi-cell storage batteries.

One of the standard procedures heretofore used commercially for testing multi-cell storage batteries has been to compare the conditions of the individual cells of the battery, either by comparing the specific gravities of the electrolyte or by comparing the cell voltages. When a storage battery begins to fail, one or more of the individual cells of the battery will begin to fail before, or will fail more rapidly than, the others. There thus occurs a cell voltage (and gravity) misalignment indicative of the failure or imminent failure, of the battery as a whole.

When the cell comparison is made by means of a hydrometer, a difference in cell gravities of about 50 points is generally accepted as proof of a faulty battery. The hydrometer is not well adapted for use in some situations however, and there has been a trend toward the cell voltage comparison test for commercial purposes, particularly in the automotive battery field.

Battery cell voltages may be measured by an "open circuit" test, in which the battery is discharged only at a low rate, on the order of a few tenths of an ampere, to supply current for the measuring equipment. In such case, it has been determined that a difference of .04–.06 volt between cell voltages is a reliable indication of a bad battery. The cell voltages of a storage battery remain near normal, when the battery is discharged at a low rate, until the battery is substantially completely discharged, or "flat." In other words, while the cell voltages may be so misaligned as to indicate that the battery is faulty, nevertheless the general range of the cell voltages remains fairly near the normal value until the capacity of the battery drops to approximately zero ampere-hours. At that point, the cell voltages fall off to relatively low values approaching zero, and the battery must be charged before a voltage test can be made. Charging the battery results in an excessive polarization of the battery plates, so that there exists an excessive voltage which masks the actual cell voltage. A cell voltage comparison test would be unreliable so long as this condition exists, and it is therefore common practice to carry out a "discharge test," wherein the battery is discharged at a high rate to remove polarization, the cell voltage comparison being made during such discharge. It has been found that if the battery is discharged at a rate of 150–200 amperes, a cell voltage difference of .07–.1 volt is indicative of a faulty battery, since the discharge tends to accentuate faults in the cell, such as shorted cells or high resistance conditions. Also, even though the battery may have been initially flat, so that charging was necessary, an open circuit test may still be used if the battery is first discharged at a high rate to remove polarization.

Originally, cell voltage comparison tests were made by connecting a single voltmeter sequentially across the cells of the battery, or by simultaneously connecting a separate voltmeter across each cell and comparing the readings of all the meters. But, where the test was carried out by service station personnel, garagemen, and others without considerable technical training, it was found that the comparisons of separate readings were not made with sufficient accuracy. Also, the tests required too much time and manipulation of the equipment by the operator. To overcome these difficulties, testers have been devised which automatically compare the cell voltages, so as to eliminate the need for mental comparison of separate readings. Such automatic testers are disclosed, for example, in application Serial Number 40,054, filed July 22, 1948, and which is now abandoned, by Lewis A. Medlar and James B. Godshalk, and Patent 2,621,231, issued December 9, 1952, to the same applicants.

Such automatic testers are characterized by the fact that a connection must be made to each battery terminal and each cell connector strap, the connections being made in a given relation. This operation is not difficult for 6-volt, 3-cell batteries, and these testers have attained considerable commercial success. But, since the advent of the automatic testers, there has been a marked trend, particularly in the automotive industry, toward use of 12-volt, 6-cell batteries. Automatic testers have not yet been devised which are capable of being connected to the 6-cell batteries by unskilled personnel.

A pressing requirement has thus developed for means by which relatively unskilled personnel can quickly test both 6-volt, 3-cell batteries and 12-volt, 6-cell batteries by cell comparison.

Accordingly, an object of the present invention is to provide a method and apparatus for testing multi-cell storage batteries by cell comparison and applicable to the testing of batteries of different normal voltages and numbers of cells.

Another object is to devise an apparatus for testing both 6-volt, 3-cell batteries and 12-volt, 6-cell batteries, wherein the only adjustment needed to convert the tester for use with either size of battery is the operation of a single manual control.

Another object is to devise a method and apparatus for testing by cell comparison batteries having a relatively large number of cells without requiring expensive electrical components in proportion to the number of cells.

A further object is to provide a cell voltage comparison type battery tester which requires only the simplest connections to the battery being tested and is therefore suitable for use by an operator who is not a trained battery technician.

Yet another object is to provide a relatively simple apparatus of the type described capable of comparing battery cell voltages under both open circuit and discharge conditions.

In order that these and other objects of the invention may be understood in detail, reference is had to the accompanying drawings which form a part of this specification and wherein.

Figure 1:
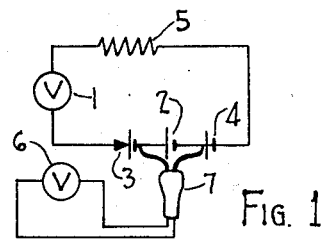
Fig. 1 is a schematic diagram illustrating one means for carrying out the method of the present invention.

In accordance with the method of the present invention, multi-cell storage batteries are tested by measuring the average voltage of all of the cells of the battery, measuring the actual voltage of each individual cell of the battery, and comparing the actual voltages with the average to determine if the voltage of any cell deviates from the average by a predetermined amount indicative of a faulty battery. Thus, I may continuously discharge the battery to obtain a first current proportional to the average cell voltage, sequentially discharge the individual cells of the battery to obtain other currents proportional to the actual cell voltages, and compare each of said other currents, as it is obtained, with the first current. Conveniently, the battery may be discharged through means producing a magnetomotive force proportional to the average cell voltage, one cell discharged through means producing a magnetomotive force proportional to the actual voltage of that cell, and the magnetomotive forces opposed to provide a net magnetomotive forces proportional to the difference between the actual voltage of that cell and the average cell voltage. These steps can then be repeated for all of the cells in sequence, or until a net magnetomotive force is obtained indicating excessive cell misalignment. By this method, I accomplish the same results heretofore obtained by comparing the actual cell voltages one with the other, since a predetermined discrepancy between the actual cell voltages and the average cell voltage will be a reliable indication of a failing battery.

As an example, assume that one cell of a 3-cell, 6-volt battery exhibits a voltage $K$ volts below normal, the other cells each having a normal voltage of 2 volts. The average cell voltage is then $2-.33K$ volts. The cell voltages are, respectively, $2-K$ volts for the bad cell and 2 volts for each good cell. The sequential comparisons of the present method provide voltage differentials of $-.67K$ volts, $+.33K$ volts and $+.33K$ volts, respectively. Similarly, if two cells of this battery are each $K$ volts low, the average cell voltage will be $2-.67K$ volts, and the cell voltages are respectively $2-K$ volts for each bad cell, and 2 volts for the good cell. The sequential comparisons provide, respectively, voltage differentials of $-.33K$ volts, $-.33K$ volts and $+.67K$ volts. Thus, regardless of whether one or two cells of the battery are low in voltage by the predetermined constant $K$ which indicates a bad battery, one of the comparisons of the present method will yield a voltage differential of $.67K$ volts.

If a 6-cell, 12-volt battery is being tested, the following results are obtained:

| No. of cells each $K$ volts low | Average cell voltage | Differential between actual cell voltage and average cell voltage | | | | | |
|---|---|---|---|---|---|---|---|
| | | 1 | 2 | 3 | 4 | 5 | 6 |
| 1 | $2-.17K$ | .83K | .17K | .17K | .17K | .17K | .17K |
| 1 and 2 | $2-.33K$ | .67K | .67K | .33K | .33K | .33K | .33K |
| 1 through 3 | $2-.50K$ | .50K | .50K | .50K | .50K | .50K | .50K |
| 1 through 4 | $2-.67K$ | .33K | .33K | .33K | .33K | .67K | .67K |
| 1 through 5 | $2-.83K$ | .17K | .17K | .17K | .17K | .17K | .83K |

Thus, regardless of whether one of the six cells or five of the six cells is low by the predetermined constant $K$ which indicates a bad battery, one of the comparisons of the present method will yield a voltage differential in the range of $.50K-.83K$. It will be noted that this range includes the maximum differentials occurring during application of the method to a 3-cell, 6-volt battery. For open circuit testing, $K$ might be taken as .06 volt, and the limits just referred to thus become .03–.05 volt.

The method may be carried out by connecting one voltmeter across the entire battery through a resistance of such value that the voltmeter responds to the average voltage of the cells, and, while the first voltmeter is so connected, sequentially connecting a second voltmeter across each individual cell of the battery to determine the actual cell voltages. Thus, as seen in Fig. 1, a first meter 1 may be connected to the terminals of the 3-cell battery 2 to be tested, the connection being through terminal clamps 3 and 4 and a resistance 5 of such value that the voltage across the meter is one third that of the 3-cell battery. The second voltmeter 6 is connected sequentially across each of the three cells by a two-pronged prod 7 to respond to the actual voltage of each cell. The readings of the two voltmeters are compared at each stage in the sequence of connection of meter 6, and a difference in readings of .04 volt ($.67 \times .06$) indicates a bad or failing battery.

The advantage of this method lies primarily in the simplicity of connection of the voltage responsive devices employed. Thus, the second voltmeter 6, Fig. 1, is simply "walked" down the series of cells of the battery by means of the prod 7, and there is no need for clamp type connections to the cell connector straps of the battery. The elimination of cumbersome connections to the individual cells is, of course, of particular importance when 12-volt batteries, having six cells, are being tested. A further advantage of this method lies in the fact that only two voltage responsive devices are employed, rather than one for each cell of the battery, regardless of the number of cells in the battery being tested.

When the method is carried out in the manner illustrated in Fig. 1, the necessity for comparing meter readings remains, and this is undesirable when the method is to be employed in service stations and the like. Accordingly, for commercial applications of that type, I prefer to employ certain apparatus embodiments of the invention, as illustrated in Figs. 2–9, which are capable of making the comparison between cell voltage and average cell voltage automatically. These embodiments are characterized by the use of two electromagnetic coils, one to be connected across the entire battery and the other to be connected sequentially across the individual cells, the resistances of the circuits and number of turns of the coils being so proportioned that the effective ampere-turns of the two coils are equal when they are so connected respectively across an entire normal battery of the type to be tested and across a single normal cell thereof. The two coils are so connected to the battery that their electromagnetic effects are opposed, and indicating means is so associated therewith as to respond to the differential in electromagnetic effects of the coils and thus indicate the differential between the voltages to which the coils respond.

Figure 2:
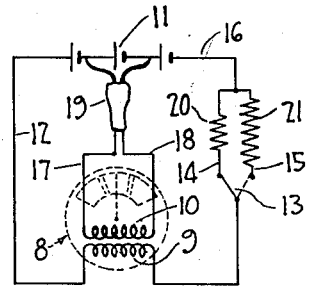
Fig. 2 is a schematic diagram showing a simple apparatus embodiment of the invention.
Figure 3:
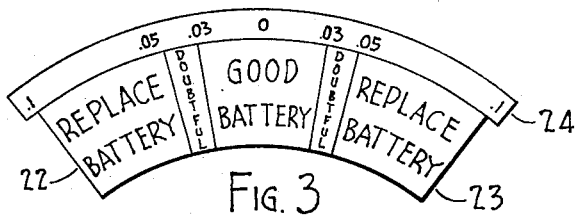
Fig. 3 is a plan view illustrating one manner in which the dial of a differential voltmeter may be calibrated for use in the apparatus of Fig. 2.

Thus, embodiment illustrated in Fig. 2 employs a differential voltmeter 8 having a pair of electromagnetic coils 9 and 10. The coil 9 is connected across the entire battery 11 to be tested by a circuit comprising conductor 12, switch 13, one of the parallel branches 14 and 15 selected by the switch 13, and conductor 16. The coil 10, on the other hand, is connected across any desired single cell of the battery by a circuit comprising conductors 17 and 18 and the twin-pronged hand prod 19.

In order that the differential between actual cell voltage, to which coil 10 responds, and average cell voltage, to which coil 9 is to respond, shall appear as the differential between the electromagnetic effects of the two coils, the coils are connected in opposition, and the resistances of the connecting circuits and the number of turns of the two coils are so adjusted that the ampere turns of the coils are substantially equal when properly connected to a normal battery in the manner described. To select the relative resistance of the circuits, resistances 20 and 21 are included in the parallel branches 14 and 15, respectively, their values being chosen in accordance with the normal voltage of the battery to be tested. Assuming that resistance 20 is to be selected by action of the switch 13 when 6-volt batteries are to be tested, and resistance 21 when 12-volt batteries are to be tested, the values of the components may be as follows to obtain substantially equal ampere-turns in the coils 9 and 10 for batteries exhibiting their normal voltages:

| Coil 9 | | Coil 10 | | Resistance 20 | Resistance 21 |
| --- | --- | --- | --- | --- | --- |
| Resistance | Turns | Resistance | Turns | | |
| $x$ ohms | $n$ | $x$ ohms | $n$ | $2x$ ohms | $5x$ ohms |
| $3x$ ohms | $n$ | $x$ ohms | $n$ | 0 ohms | $3x$ ohms |
| $x$ ohms | $n$ | $x$ ohms | $3n$ | 0 ohms | $x$ ohms |

The moving system of the meter 8, which may be of any suitable conventional type, responds to the difference in electromagnetic effects of the coils 9 and 10 of the meter, and such difference is directly proportional to the difference between the actual voltage of the cell across which the prod 19 is connected and the average voltage of all of the cells of the battery. Thus, the dial 22 of the meter, Fig. 3, may be calibrated in terms of "good," "doubtful" and "replace" on lower scale 23, and in terms of volts on upper scale 24.

Figure 4:
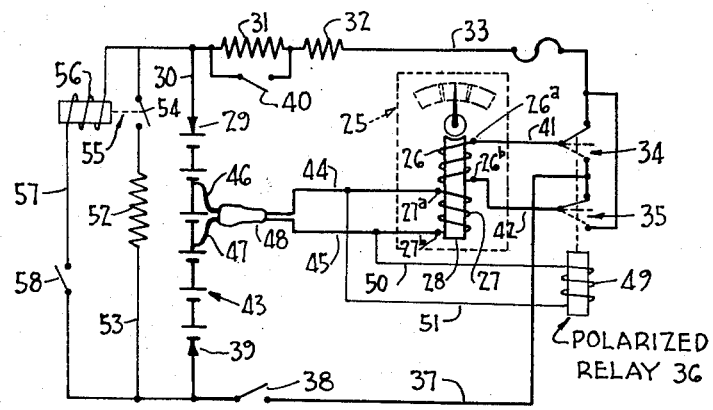
Fig. 4 is a schematic diagram illustrating a further apparatus embodiment of the invention.

Fig. 4 illustrates a more elaborate embodiment of the invention, including means for automatically maintaining the meter coils in opposition and also means for discharging the battery to remove polarization effects. The device includes a differential voltmeter 25 having coils 26 and 27 wound upon a core 28. The meter has been illustrated diagrammatically as being of the moving magnet disc type described in Patent 2,446,431 to Pfeffer, though any other suitable type of meter may be employed. The meter is preferably calibrated in the manner described with reference to Figs. 2 and 3.

Coil 26 is connected in a circuit comprising positive terminal clamp 29, conductor 30, resistances 31 and 32, conductor 33, the contact sets 34 and 35 of a polarized relay 36, conductor 37, manual on-off switch 38, and negative terminal clamp 39. A switch 40 is provided to shunt out resistance 31 when a 6-volt battery is to be tested, and to include that resistance in the circuit when a 12-volt battery is to be tested. The contact sets 34 and 35 are arranged as pole reversing contacts. Thus, one terminal 26ª of coil 26 is connected by conductor 41 to the movable contact of contact set 34, hence either to the positive clamp 29 as shown or to the negative clamp 39, depending upon the position occupied by the movable contact. Similarly, the other terminal 26ᵇ of coil 26 is connected by conductor 42 to the movable contact of contact set 35, hence either to negative clamp 39 as shown or to positive clamp 29, depending upon the position of the movable contact. Clamps 29 and 39 are visually identifiable as positive and negative clamps, respectively. Therefore, when the clamps are properly applied to a battery 43 to be tested, the coil 26 will always have a given polarity for a given position of the movable contacts of relay 36.

Terminals 27ª and 27ᵇ are connected by conductors 44 and 45 to the contact prongs 46 and 47, respectively, of a twin-pronged hand prod 48, so that coil 27 may be selectively connected across any desired individual cell of the battery 43. Actuating winding 49 of polarized relay 36 is connected by conductors 50 and 51 between conductors 44 and 45, so as to be in parallel with coil 27 of meter 25.

The movable contacts of contact sets 34 and 35 occupy a centered position, so that the circuit of coil 26 is broken, when actuating winding 49 is deenergized. The relay 36, being of the polarized type, is such that the movable contacts will be actuated in one direction when actuating winding 49 is energized with one polarity and in the opposite direction when that winding is energized with the opposite polarity. Winding 49 is so wound and connected with respect to coil 27 that the direction of actuation of the relay is such as to connect terminal 26ª to the positive clamp 29 and terminal 26ᵇ to the negative clamp 39 when prod 48 is connected with the polarity shown in Fig. 4. Thus, the relay 49 will function to maintain coils 26 and 27 in electromagnetic opposition regardless of the manner in which prod 48 is connected to a cell of the battery, so long as clamps 29 and 39 have been properly connected to the battery.

A discharge resistor 52 is connected across the battery by a conductor 53 including normally open contacts 54 of a relay 55. Actuating winding 56 of the relay 55 is connected in parallel with the series combination of resistor 52 and contacts 54, such connection being made by conductor 57 including a switch 58. Switch 58 is preferably of the spring opened, manually closed type, so that the winding 56 will be energized to close contacts 54 and cause discharge of the battery only while the operator holds switch 58 closed.

To adapt the apparatus for carrying out my testing method with either 6-volt or 12-volt batteries, the values of the various electrical components may be: equal turns in coils 26 and 27; coils 26 and 27 each of $x$ ohms resistance, resistance 32 (used alone for 6-volt operation) $2x$ ohms, and resistance 31, $3x$ ohms (so that the series combination of resistance 31 and 32, for 12-volt operation, totals $5x$ ohms).

In use, the operator adjusts selector switch 40 in accordance with the type of battery to be tested, and connects terminals 29 and 39 to the positive and negative terminals of the battery, respectively. At this stage, it is to be noted that there is no movement of the meter needle, since relay 36 has not yet been energized. Assuming that the battery has not just been charged, and that there is therefore no excessive polarization, the operator then connects prod 48 across an end cell of the battery, without regard to polarity, and observes meter 25 to see if an indication in one of the "replace battery" zones of the dial results. If so, the faulty condition of the battery has been demonstrated, since the presence of one cell with excessively abnormal voltage shows the battery to be bad. If the meter does not indicate in one of the "replace battery" zones, the operator continues with the test, connecting the prod to each of the remaining cells in sequence and observing the meter for each connection. If it has been necessary to recharge the battery to obtain a voltage level adequate for testing, the operator closes switch 58 for a short time, so allowing discharge of the battery through resistance 52 to remove excessive polarization. The discharge may then be terminated, and the test carried out as just described.

Figures 5, 7:
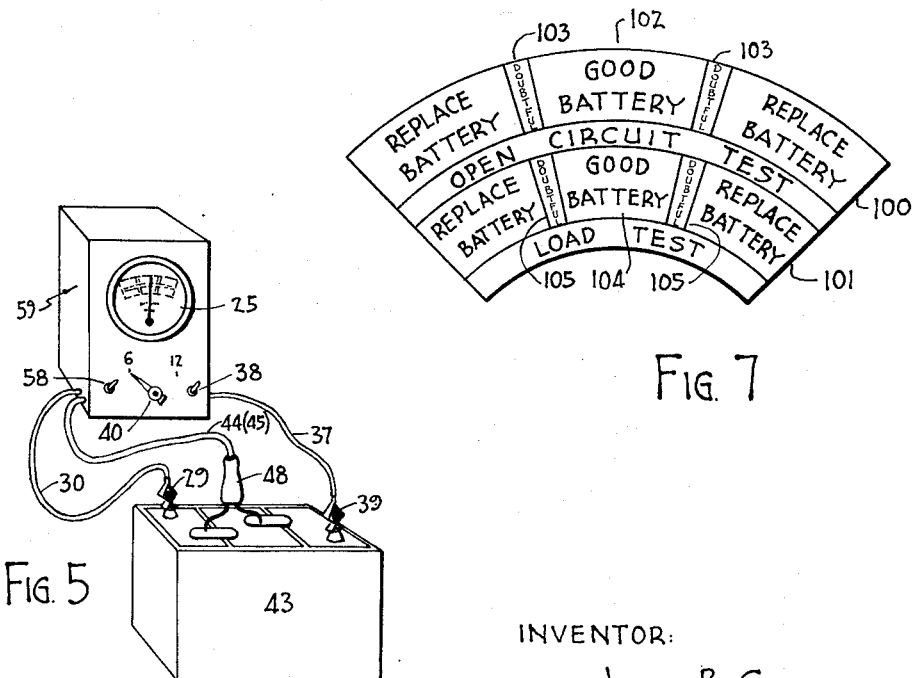
Fig. 5 is a perspective view showing the manner in which a commercial embodiment of the apparatus of Fig. 4 may be connected to the battery.
Fig. 7 is a plan view showing the manner in which the meter dial of the apparatus of Fig. 6 may be calibrated.

The overall physical arrangement of such a device may be as illustrated in Fig. 5. The electrical components of the tester may be housed in a suitable casing 59, with the dial of meter 25 and the operating members of switches 38, 40 and 58 exposed. Separate insulated leads extend to terminal clamps 29 and 39. The conductors 44 and 45 are combined in a single insulated cable connecting to hand prod 48.

Figure 6:
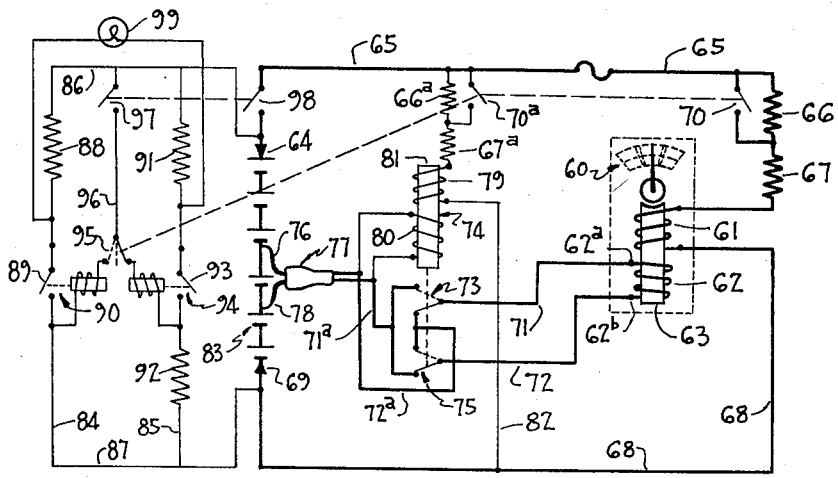
Fig. 6 is a schematic diagram illustrating an apparatus embodiment of the invention adapted for making discharge tests.

In Fig. 6, I have shown a modification of the apparatus of Fig. 4 adapted to carry out discharge tests. Here, the differential voltmeter 60 includes coils 61 and 62 wound oppositely on a common core 63. The meter may be, for example, of the same type as that described with reference to Fig. 4, but will employ two calibrated scales as hereinafter described.

Coil 61 of the meter is connected across the entire battery to be tested by a circuit comprising terminal clamp 64, conductor 65, resistances 66 and 67, conductor 68, and terminal clamp 69. As will be explained, it is not necessary in this embodiment that the clamps 64 and 69 be connected to the battery with any regard to polarity. A switch 70 is provided to shunt out resistance 66 when a 6-volt battery is to be tested and to include that resistance when a 12-volt battery is to be tested.

The terminals $62^a$ and $62^b$ of the coil 62 are connected to the conductors 71 and 72, respectively. Conductor 71 is connected to the movable contact of contact set 73 of a double pole double throw relay 74. Similarly, conductor 72 is connected to the movable contact of contact set 75 of relay 74. The contact sets of relay 74 are arranged as pole reversing contacts, one pair of stationary contacts being connected to conductor $71^a$, hence to contact prong 76 of a twin-pronged hand prod 77, and the other pair of stationary contacts being connected to conductor $72^a$, hence to contact prong 78 of the prod. Thus, the hand prod 77 serves to connect the coil 62 of meter 60 across any desired cell of the battery with the polarity depending upon the position of the contacts of relay 74.

Relay 74 includes a pair of actuating windings 79 and 80 wound oppositely on a common core 81. Winding 79 is connected by conductor 82 between conductors 65 and 68, and so in parallel with coil 61 or meter 60. Winding 80 is connected between conductors $71^a$ and $72^a$, thus in parallel with coil 62 of meter 60. The windings 79 and 80 are so oriented and connected that they aid each other electromagnetically when the relative directions of current flow in the circuit of coil 61 on the one hand, and the circuit of coil 62, on the other hand, considering the relay 74 to be relaxed as shown, are such that the coils 61 and 62 aid each other electromagnetically. Similarly, the windings 79 and 80 oppose each other when said relative directions of current are such that coils 61 and 62 oppose each other. Relay 74 will be actuated to reverse the connection of coil 62 only when the windings 79 and 80 aid each other electromagnetically. Therefore, with clamps 64 and 69 connected to the battery in random polarity, prod 77 may be connected across a single cell of the battery without regard to polarity. If the connections happen to be so made that coils 61 and 62 oppose each other, relay 74 will remain relaxed. But, if the connections are such that coils 61 and 62 aid each other, then windings 79 and 80 also aid, and relay 74 is actuated to reverse the connection of coil 62, placing coils 61 and 62 in electromagnetic opposition.

It is desirable that the electromagnetic effects of windings 79 and 80 be substantially equal, so that there will be substantially no net electromagnetic effect operating in relay 74 when those windings are opposed. I therefore include in conductor 82, in series with the winding 79, resistance $66^a$ and $67^a$, with a switch $70^a$ connected to shunt out resistance $66^a$ when closed.

In order to discharge the battery 83 during test, I provide two parallel branches 84 and 85 connected across the battery by leads 86 and 87. Branch 84 includes a single discharge resistor 88 and, in series therewith, the normally open contacts 89 of a relay 90. Branch 85 includes, in series, two discharge resistors 91 and 92, and the normally open contacts 93 of a relay 94. To selectively energize the relays 90 and 94, I provide a 3-position selector switch 95 having its movable contact connected via conductor 96 and on-off switch 97, to lead 86. The actuating winding of relay 90 is connected between one stationary contact of switch 95 and branch 84 between the contacts of that relay and lead 87, as shown. Similarly, the actuating winding of relay 94 is connected between the other stationary contact of switch 95 and branch 85 between the contacts of relay 94 and lead 87, as shown. Switch 95 is normally open, selecting neither relay. With switch 97 closed, switch 95 can be operated in either direction to energize to closed position either of the relays 90 and 94, so completing either one of the branches 84 and 85 desired. So that the operator may not leave one of the discharge branches completed after making a test, I arrange the on-off switch 97 of the discharge circuit to be operated by the same operating means as on-off switch 98 of the circuit for coil 61. Also, I connect a suitable pilot-light or other electro-responsive indicator 99 between the branches 84 and 85, as shown, so as to be activated whenever either of those branches is complete. Branch 84 provides a relatively smaller resistance, suitable for discharging 6-volt batteries. Branch 85 provides a relatively larger resistance suitable for discharging 12-volt batteries. One branch of the discharge circuit must be selected by operation of switch 95 in accordance with the voltage rating of the battery to be tested. Similarly, switches 70 and 70$^a$ must be operated in accordance with the battery voltage. I therefore operate switches 70, 70$^a$, and 95 by means of a common operator, as indicated by dotted lines in Fig. 6, so that when switches 70 and 70$^a$ are open, switch 95 is in a position selecting lower resistance branch 84.

The electrical components of the circuits for coils 61 and 62 may have the same proportional values as the corresponding components of Fig. 4, or may be otherwise proportioned as hereinbefore described, so that the ampere-turns of coils 61 and 62 are substantially equal when the apparatus is properly connected to a normal battery of the voltage rating for which switches 70 and 70$^a$ are adjusted.

To use the apparatus of Fig. 6, the operator selects the positions of switches 70, 70$^a$ and 95 in accordance with whether a 6-volt or a 12-vole battery is to be tested. Clamps 64 and 69 are then connected to the battery terminals without regard to polarity. Switches 97 and 98 are then closed. The operator then connects hand prod 77 across an end cell of the battery without regard to polarity, observing the meter 60 to see if an indication in the "replace" sector of the dial of that meter results. If such an indication is obtained, the battery is demonstrated to be faulty. If not, the prod 77 is connected to the next cell, and so on in sequence, either until an excessive cell voltage misalignment is indicated by the meter or until the prod has been connected to all of the cells.

While the apparatus of Fig. 6 has been described only for making discharge tests, it will be obvious that this apparatus can also be used to carry out an open circuit test. If this is desired, switches 97 and 98 should be separately operable, so that one may be closed without closing the other. Also, as already pointed out, the critical cell voltage differential which will indicate a faulty battery is different for a discharge test than for an open circuit test. For tests under load, this value may be in the range of .07–.1 volt, while for tests not under a substantial load, this value may be in the range of .04–.06 volt. I prefer to provide the meter 60 with two different scales as illustrated in Fig. 7, one scale 100 being calibrated for open circuit testing and the other scale 101 being calibrated for discharge or load testing. For example, the critical cell voltage differential may be taken as .05 volt for open circuit testing. In this case, the "good battery" zone 102 of scale 100 may extend on both sides of zero to .035 volt, and the "doubtful" zones 103 will extend to approximately .055 volt. The critical cell voltage differential may be taken as .07 volt for discharge testing, in which case the "good battery" zone 104 may extend to .05 volt, and the "doubtful" zones 105 will extend to .07 volt.

Figure 8:
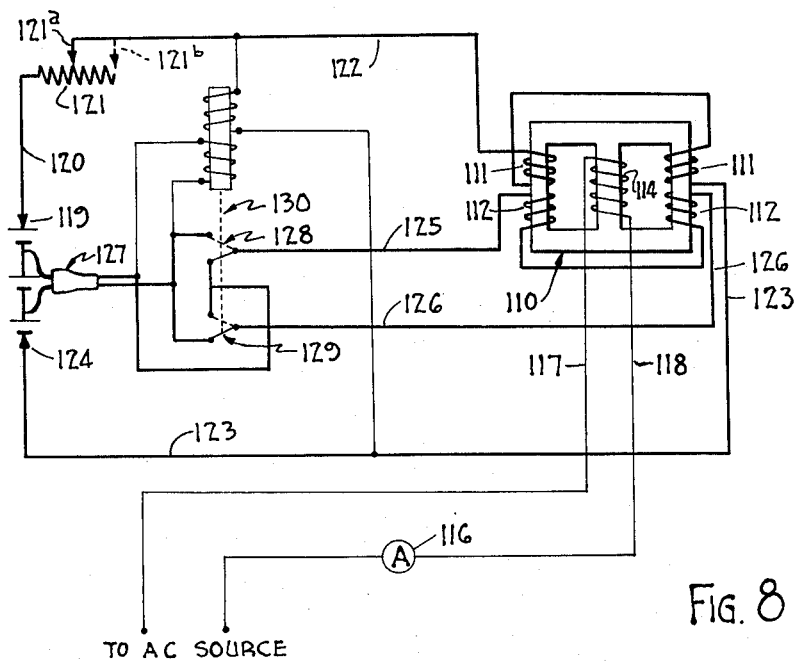
Fig. 8 is a schematic diagram illustrating a further apparatus embodiment of the invention employing a saturable reactor.

Fig. 8 illustrates an embodiment of my apparatus employing a saturable reactor 110 as the differential electromagnetic device. The reactor 110 includes D. C. coil pairs 111 and 112 wound oppositely upon the outer legs of the usual iron core 113, and A. C. winding 114 wound upon the center leg of the core. The winding 114 is connected in series with an A. C. ammeter 116 in an A. C. supply circuit comprising conductors 117 and 118.

Coil pair 111 is connected across the entire battery to be tested by a circuit comprising terminal clamp 119, conductor 120, adjustable resistance 121, conductors 122 and 123, and terminal clamp 124. Coil pair 112 is connected across any desired single cell of the battery by circuit means comprising conductors 125 and 126 and a twin-pronged hand prod 127. Contact sets 128 and 129 of a two coil, double pole double throw relay 130 are arranged in the circuit of coil pair 112 as pole reversing contacts. The relay 130 is connected and arranged in the same manner as relay 74, Fig. 6, and functions to automatically maintain coil pairs 111 and 112 in electromagnetic opposition regardless of the manner in which the operator makes the connections to the battery.

Adjustable resistance 121 is provided with adjusting means having two calibrated positions 121$^a$ and 121$^b$, one giving the proper resistance for testing a 6-volt battery, and the other giving the proper resistance for testing a 12-volt battery. The numbers of turns of coils 111 and 112 and the resistances of their circuits are so proportioned that the effective ampere-turns of those coils are substantially equal when properly connected to a normal battery as shown. Accordingly, if the cell across which prod 127 is connected does not vary materially in voltage from the average cell voltage, there will be no variation in the reading of meter 116. But, if coil 112 is connected across a cell the voltage of which is substantially different from the average cell voltage of the battery, a net magnetomotive force results which saturates the iron core 113 of the reactor to an extent depending upon the difference between the actual cell voltage and the average cell voltage. With its core partially saturated, the reactor 110 presents a lower impedance to the A. C. voltage applied across conductors 117 and 118, and there will result an increase in the alternating current flow to which the meter 116 responds. Since variations in alternating current flow affecting the meter 116 are proportional to the difference between the actual voltage of the individual cell being checked and the average cell voltage, the meter may be calibrated in terms of "good," "doubtful" and "replace," as in Figs. 3 and 7. The meter 116 will, however, deflect in but one direction, rather than in either direction as in the apparatus of Fig. 2 for example, so that the scale of meter 116 need include only one "doubtful" and one "replace" zone.

The adjustable resistance 121 serves the same purpose as resistances 66, 67, 66$^a$ and 67$^a$ in Fig. 6. However, the resistance 121 is in series with the parallel combination of coil 111 and one winding of relay 130, so that the value of resistance 121 should be reduced by one half when the relay and meter coils have the same resistance. Thus, the lower value of resistance 121, for position 121$^a$, may be $x$ ohms, and the higher value, for position 121$^b$, 2.5 $x$ ohms. Coils 111 and 112 may then both have the same number of turns and each be of $x$ ohms resistance. Likewise, the two windings of relay 130 may have equal turns and each be of x ohms resistance.

Figure 9:
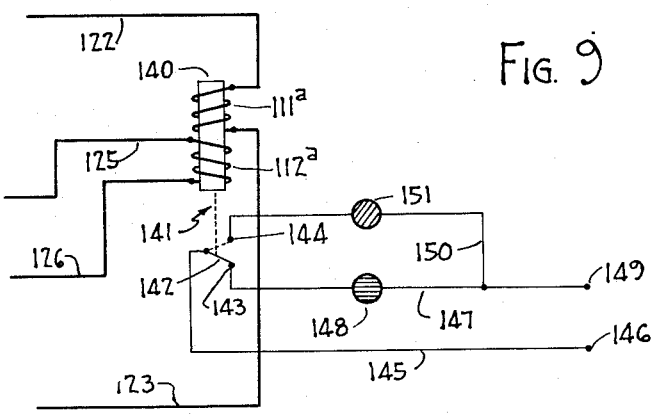
Fig. 9 is a schematic diagram of yet another apparatus constructed in accordance with the invention and employing a differential relay to make the voltage comparisons.

In place of the saturable reactor 110, Fig. 8, I may employ a differential relay as the differential electromagnetic means for making the voltage comparisons. Thus, Fig. 9 shows portions of conductors 122, 123, 125 and 126 of the circuit of Fig. 8, but the coils 111a and 112a are wound oppositely upon the core 140 of a differential relay 141. The movable contact 142 of relay 141 normally engages a fixed contact 143, but upon actuation of the relay is moved into engagement with a fixed contact 144. Movable contact 142 is connected by conductor 145 to one terminal 146 of any suitable source of current. Fixed contact 143 is connected via conductor 147 and an incandescent lamp 148 of one color to the other terminal 149 of the current source. Fixed contact 144 is connected via conductor 150 and an incandescent lamp 151 of another color to the terminal 149. Thus, so long as relay 141 is relaxed, lamp 148 is energized but, upon actuation of the relay, lamp 148 is extinguished and lamp 151 energized.

Relay 141 is constructed to be actuated only by a differential electromagnetic effect of the coils 111a and 112a of a magnitude such as is produced by a cell voltage misalignment indicative of a bad battery, smaller differentials failing to actuate the relay. Thus, so long as cell voltage differentials are in the allowable range, lamp 148 is continuously energized. But, when an excessive cell voltage differential is encountered during the test, the relay responds to the predetermined difference in electromagnetic effects of the coils 111a and 112a, so causing lamp 148 to be extinguished and lamp 151 to be energized. Thus, in use, the operator need only observe the two lamps as the connections of the hand prod are made to each cell.

It will be obvious that the differential relay 141, Fig. 9, or the saturable reactor 110, Fig. 8, may be used in place of the differential voltmeter in the circuits herein described.

Attention is directed to my co-pending application, Serial No. 325,661, filed of even date herewith, wherein battery testing apparatus including connection correcting relays such as those described herein are described and claimed.

I claim:

1. A method for testing multi-cell storage batteries comprising measuring the average cell voltage of the battery, measuring the actual voltage of each individual cell of the battery, and comparing the actual voltages of each cell with the average cell voltage to determine if the voltage of any cell deviates from the average by a predetermined amount.

2. A method for testing multi-cell storage batteries comprising continuously measuring the average cell voltage of the battery, measuring the actual voltage of each individual cell in sequence while making such continuous measurement of the average cell voltage, and comparing each actual cell voltage with the average voltage to determine if the voltage of any cell deviates from the average by a predetermined amount.

3. A method for testing a multi-cell storage battery comprising discharging the battery to produce an electrical current proportional to the average cell voltage of the battery, sequentially discharging the individual cells of the battery to obtain from each cell an electrical current proportional to the voltage of that cell, and comparing each current so produced with said first mentioned current to determine if the voltage of any cell of the battery deviates from the average by a predetermined amount indicative of a faulty battery.

4. A method for testing a multi-cell storage battery comprising continuously discharging the battery to produce a first electrical current, continuously deriving from said first current a value proportional to the average cell voltage of the battery, sequentially discharging the individual cells of the battery to produce other electrical currents, deriving from such other currents values proportional to the actual voltages of the individual cells, and comparing each value so produced with said first mentioned value to determine if the voltage of any cell of the battery deviates from the average by a predetermined amount.

5. A method for demonstrating the condition of a faulty multi-cell storage battery comprising discharging the battery through means producing a magnetomotive force proportional to the average cell voltage of the battery, discharging a single cell of the battery through means producing a magnetomotive force proportional to the actual voltage of that cell, opposing said magnetomotive forces to obtain a net magnetomotive force proportional to the difference between the actual voltage of said single cell and the average cell voltage, and sequentially repeating such steps with other single cells of the battery until a net magnetomotive force of a predetermined magnitude indicative of excessive cell voltage misalignment is obtained.

6. In a device for testing by cell comparison multi-cell storage batteries of a given normal voltage, the combination of two electromagnetic coils, a first circuit including one of said coils and means for connecting the same across the entire battery to be tested, a second circuit including the other of said coils and means for selectively connecting said other coil across any desired single cell of the battery in such a manner that the electromagnetic effects of said coils are opposed, the resistances of said circuits and the numbers of turns of said coils being so proportioned that the effective ampere-turns of said coils are substantially equal when so connected respectively across an entire normal battery at said given voltage and across a single normal cell thereof, and indicating means responsive to the difference in electromagnetic effects of said coils.

7. In a device for testing by cell comparison multi-cell storage batteries of a given normal voltage, the combination of a differential electrical meter including a pair of electromagnetic coils, a first circuit including one of said coils and means for connecting the same across the entire battery to be tested, and a second circuit including the other of said coils and a twin-pronged hand prod for connecting said other coil selectively across any desired single cell of the battery, the resistances of said circuits and numbers of turns of said coil being so proportioned that the effective ampere-turns of said coils are substantially equal when so connected respectively across an entire normal battery at said given voltage and across a single normal cell thereof.

8. In a device for testing by cell comparison multi-cell storage batteries of a given normal voltage, the combination of two electromagnetic coils, a first circuit including one of said coils and means for connecting the same across the entire battery to be tested, a second circuit including the other of said coils and means for selectively connecting said one coil across any desired single cell of the battery in such a manner that the electromagnetic effects of said coils are opposed, the resistances of said circuits and the numbers of turns of said coils being so proportioned that the effective ampere-turns of said coils are substantially equal when so connected respectively across an entire normal battery at said given voltage and across a single normal cell thereof, indicating means, and means for actuating said indicating means only in response to the occurrence of a predetermined differential in the electromagnetic effects of said coils.

9. In a device for testing by cell comparison multi-cell storage batteries of a given normal voltage, the combination of a two-coil differential relay, a first circuit including one of the coils of said relay, and means for connecting the same across the entire battery to be tested, a second circuit including the other coil of said relay and means for selectively connecting said other coil across any desired individual cell of the battery in such a manner that the electromagnetic effects of said coils are opposed, the resistances of said circuits and numbers of turns of said coils being so proportioned that the effective ampere-turns of said coils are substantially equal when so connected respectively across an entire normal battery at said given voltage and across a single normal cell thereof, an electro-responsive indicating device, and circuit means including the contacts of said relay and connected to energize said indicating device whenever said relay is actuated.

10. In a device for testing by cell comparison multi-cell batteries of two different given normal voltages, the combination of two electromagnetic coils; a first circuit including one of said coils and means for connecting the same across the entire battery to be tested; resistance means in said first circuit selectively variable between two predetermined values in accordance with the normal voltage of the battery to be tested; a second circuit including the other of said coils and means for selectively connecting the same across any desired single cell of the battery in such manner that the electromagnetic effects of said coils are opposed, the resistances of said circuits and the numbers of turns of said coils being so proportioned that the effective ampere-turns of said coils are substantially equal when so connected respectively across an entire normal battery at one of said given voltages, with said resistance means at one of said values, and across a single normal cell thereof, and also when so connected respectively across an entire normal battery at the other of said given voltages, with said resistance means at the other of said values, and across a single normal cell thereof; and indicating means responsive to the difference in electromagnetic effects of said coils.

11. In an apparatus for testing by cell comparison automotive storage batteries of two different normal voltages, the combination of a differential electromagnetic device including a pair of operating coils; a first circuit including one of said coils, two parallel branches of different resistance, means for selectively connecting said one coil in series with either of said branches to select the resistance of said first circuit in accordance with the voltage of the battery to be tested, and means for connecting the series combination of said one coil and the parallel branch so selected across the entire battery to be tested; a second circuit including the other of said coils and means for selectively connecting said other coil across any desired individual cell of the battery in such manner that the electromagnetic effects of said coils are opposed, and indicating means responsive to the difference in electromagnetic effects of said coils.

12. In an apparatus for testing by cell comparison multi-cell storage batteries of different given normal voltages, the combination of two electromagnetic coils; a first circuit including one of said coils and means for connecting the same across the entire battery to be tested; means in said first circuit for varying the series resistances thereof selectively between predetermined values in accordance with the voltage rating of the battery to be tested; a second circuit including the other of said coils and a twin-pronged hand prod for selectively connecting the same across any desired individual cell of the battery, the resistances of said circuits and numbers of turns of said coils being so proportioned, when the resistance of said first circuit is selected in accordance with the voltage rating of the battery to be tested, that the effective ampere-turns of said coils will be substantially equal when so connected respectively across the entire battery and an individual cell thereof if the cell voltages of the battery are normal; and indicating means responsive to the difference in electromagnetic effects of said coils.

13. In an apparatus for testing by cell comparison multi-cell storage batteries of different given normal voltages, the combination of two electromagnetic coils, first circuit means including one of said coils for discharging the entire battery to produce a magnetomotive force proportional to the average cell voltage of the battery, means for selectively varying the resistance of said first circuit means in accordance with the voltage rating of the battery to be tested, second circuit means including the other of said coils for selectively discharging the individual cells of the battery in sequence to produce magnetomotive forces proportional to the actual cell voltages, and indicating means operatively associated with said coils and responsive to the difference in magnetomotive forces produced thereby.

14. In an apparatus for testing by cell comparison multi-cell storage batteries of two different given normal voltages, the combination of a differential electromagnetic device having two operating coils, first circuit means for discharging the entire battery to be tested through one of said coils to produce a magnetomotive force proportional to the average cell voltage of the battery, means for selectively varying the resistance of said first circuit means in accordance with the voltage rating of the battery to be tested, second circuit means for selectively discharging the individual cells of the battery through the other of said coils to produce magnetomotive forces proportional to the actual cell voltages, two discharge circuits for discharging the battery at different relatively high rates, and means for selectively connecting either of said discharge circuits to the battery in accordance with the voltage rating thereof.

No references cited.